(12) United States Patent
Kim

(10) Patent No.: US 9,509,822 B2
(45) Date of Patent: Nov. 29, 2016

(54) ELECTRONIC APPARATUS AND METHOD OF SELECTIVELY APPLYING SECURITY IN MOBILE DEVICE

(71) Applicant: Seungman Kim, McLean, VA (US)

(72) Inventor: Seungman Kim, McLean, VA (US)

(*) Notice: Subject to any disclaimer, the term of this patent is extended or adjusted under 35 U.S.C. 154(b) by 61 days.

(21) Appl. No.: 14/181,728

(22) Filed: Feb. 17, 2014

(65) Prior Publication Data

US 2015/0237187 A1 Aug. 20, 2015

(51) Int. Cl.
| H04M 1/66 | (2006.01) |
|---|---|
| H04M 1/67 | (2006.01) |
| H04M 1/673 | (2006.01) |

(52) U.S. Cl.
CPC ............. *H04M 1/67* (2013.01); *H04M 1/673* (2013.01)

(58) Field of Classification Search
CPC ............................. H04M 1/67; H04M 1/673
See application file for complete search history.

(56) References Cited

U.S. PATENT DOCUMENTS

| 8,600,056 | B2 | 12/2013 | Heurtaux et al. |
|---|---|---|---|
| 8,600,060 | B2 | 12/2013 | Priestley et al. |
| 8,613,070 | B1 | 12/2013 | Borzycki et al. |
| 8,626,125 | B2 | 1/2014 | Lee et al. |
| 8,627,433 | B2 | 1/2014 | Conner et al. |
| 8,627,438 | B1 | 1/2014 | Bhimanaik |
| 8,646,069 | B2 | 2/2014 | Kim et al. |
| 8,649,759 | B2 | 2/2014 | Scott et al. |
| 8,751,065 | B1 * | 6/2014 | Kato ................ H04M 1/72533 340/426.13 |
| 2004/0203895 | A1 | 10/2004 | Balasuriya |
| 2006/0128305 | A1 | 6/2006 | Delalat |
| 2007/0197261 | A1 * | 8/2007 | Humbel ................ G06Q 30/00 455/558 |
| 2008/0070503 | A1 * | 3/2008 | Bang ................... H04L 63/0853 455/41.2 |
| 2009/0011796 | A1 | 1/2009 | Ormson |
| 2012/0009896 | A1 * | 1/2012 | Bandyopadhyay ... G06F 1/1643 455/411 |
| 2013/0298024 | A1 | 11/2013 | Rhee et al. |
| 2014/0283135 | A1 * | 9/2014 | Shepherd et al. .............. 726/29 |
| 2014/0330569 | A1 * | 11/2014 | Kolavennu ............. G10L 21/16 704/275 |

FOREIGN PATENT DOCUMENTS

| EP | 2364004 A1 | 9/2011 |
|---|---|---|
| WO | WO 2004070591 A1 | 8/2004 |
| WO | WO 2006090899 A1 | 8/2006 |
| WO | WO 2012093784 A2 | 7/2012 |

OTHER PUBLICATIONS

Notification of transmittal of the internaltional search report and the written opinion (12 pages) dated on Jun. 11, 2015.

* cited by examiner

*Primary Examiner* — Idowu O Osifade
(74) *Attorney, Agent, or Firm* — EIPG LLC

(57) ABSTRACT

A mobile device includes a display unit to display a screen to set the mobile device in a security mode and a condition as a safe zone in the security mode, a user interface to receive a user input to activate the mobile device, and a control unit to selectively apply the security mode in response to the user input when a current condition is identical to the set condition.

19 Claims, 8 Drawing Sheets

ELECTRONIC APPARATUS AND METHOD OF SELECTIVELY APPLYING SECURITY IN MOBILE DEVICE

BACKGROUND OF THE INVENTIVE CONCEPT

1. Field of the Inventive Concept

The present inventive concept relates to an electronic apparatus and method of selectively applying a security mode in a mobile device.

2. Description of the Related Art

A conventional electronic mobile device, for example, a cellular phone, is set to a security mode or a non-security mode. When the set security mode is set, a user has to input a security code by enter a password, an image, or a geniture though a user interface unit. That is, a user has to input the security code every time to access the mobile device set with the security mode.

Even if a user is in a security safe zone, the user has to enter the security code previously set in the security mode. In order for the user to avoid inconvenience in the security safe zone, a user has to disable the security mode to avoid any inconvenience to enter the security code, and then later enable the security mode.

Moreover, since the mobile device is accessed only with the security code set in the security mode, no one is allowed to access the mobile device without the set security code. That is, a person having a high priority or authorization to access the mobile device cannot access the mobile device of a person having a lower priority or authorization.

SUMMARY OF THE INVENTIVE CONCEPT

The present inventive concept provides an electronic apparatus to selectively apply a security mode in a mobile device.

The present inventive concept provides a method of selectively applying a security mode in a mobile device.

The present inventive concept provides a computer readable medium to contain computer readable codes as a program to execute a method of selectively applying a security mode in a mobile device.

Additional features and utilities of the present inventive concept will be set forth in part in the description, which follows and, in part, will be obvious from the description, or may be learned by practice of the present inventive concept.

The foregoing and/or other features and utilities of the present inventive concept may be achieved by providing a mobile device including a display unit to display a screen to set the mobile device in a security mode and a condition as a safe zone in the security mode, a user interface to receive a user input to activate the mobile device, and a control unit to selectively apply the security mode in response to the user input when a current condition is identical to the set condition.

The foregoing and/or other features and utilities of the present inventive concept may be achieved by providing a mobile device having a photographing unit, a display unit to display a first screen to set the mobile device in a security mode and to display a second screen to set a predetermined condition as a safe zone of the security mode, a user interface to receive an activation key to provide a user input to activate the mobile device, and a control unit configured to control the display to display a third screen to provide a process for the security mode in response to the user input when a current condition of the mobile device is not same as the predetermined condition in the security mode, and to generate a fourth screen of a normal operation mode without generating the third screen for security mode in response to the user input when the current condition of the mobile device is same as the predetermined condition.

The predetermined condition may include at least one of an area condition and a time condition.

The predetermined condition may include a connectable condition to connect to an access point, a Bluetooth device, or a wireless communication station.

The predetermined condition may include a condition to be connected to an external communication apparatus.

The external communication apparatus may include at least one of a WiFi device, a Bluetooth device, a home appliance apparatus, a medical device, or a vehicle.

The control unit may control the display unit to display a fifth screen to set a non-safe zone as another condition in a non-security mode.

The control unit may apply another security mode according to the another condition in the non-security mode in response to the user input.

The fourth screen may include a state section to display one or more states including a state corresponding to the set condition, and a menu section to display one or more menus.

The menu section may include a user finger reachable area and a user finger unreachable area, and the one or more menus may be displayed in the user finger reachable area of the menu section.

The foregoing and/or other features and utilities of the present inventive concept may be achieved by providing a method of controlling a mobile device having a photographing unit, the method including displaying a first screen on a display unit to set the mobile device in a security mode, and a second screen on the display unit to set a predetermined condition as a safe zone of the security mode, providing an activation key as a user input to activate the mobile device, and controlling the display to display a third screen on the display unit to provide a process for the security mode in response to the user input when a current condition of the mobile device is not same as the predetermined condition in the security mode, and to display a fourth screen of a normal operation mode on the display unit without generating the third screen for security mode in response to the user input when the current condition of the mobile device is same as the predetermined condition.

The setting of the predetermined condition may include setting at least one of an area condition and a time condition.

The setting of the predetermined condition may include setting a connectable condition to connect to an access point, a Bluetooth device, or a wireless communication station.

The setting of the predetermined condition may include setting a condition to be connected to an external communication apparatus.

The external communication apparatus may include at least one of a WiFi device, a Bluetooth device, a home appliance apparatus, a medical device, or a vehicle.

The controlling of the display unit may include displaying a fifth screen to set a non-safe zone as another condition in a non-security mode.

The method may further include applying another security mode according to the another condition in the non-security mode in response to the user input.

The fourth screen may include a state section to display one or more states including a state corresponding to the set condition, and a menu section to display one or more menus.

The menu section may include a user finger reachable area and a user finger unreachable area, and the displaying of the one or more menus may include displaying the one or more menus in the user finger reachable area of the menu section.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
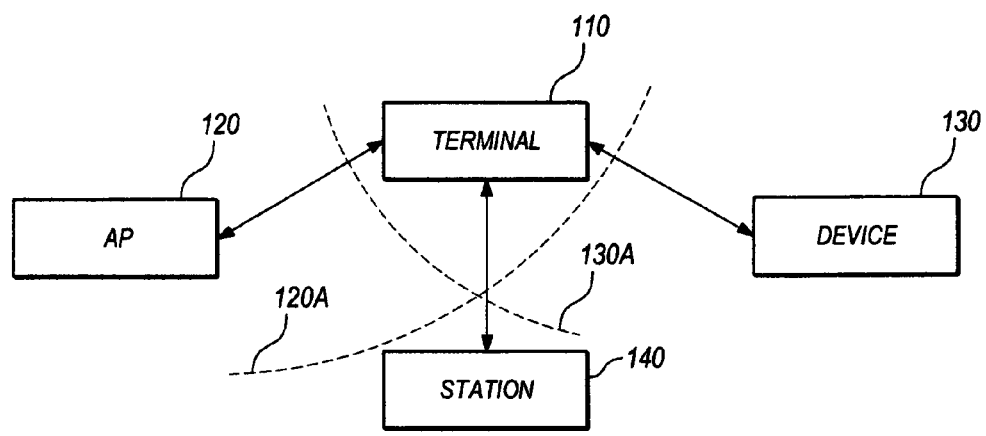
FIG. 1 is a block diagram illustrating an electronic terminal to communicate with external devices according to an embodiment of the present inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 illustrates an electronic terminal apparatus 110 to communicate with one or more external apparatuses according to an embodiment of the present inventive concept. The electronic terminal apparatus 110 may be a computer apparatus, a portable personal computer, a mobile electronic device, a mobile phone, a mobile tablet apparatus, a mobile tablet computing apparatus, an audio or video recording and/or reproducing apparatus, a photographing apparatus, a communication device, etc.

The external apparatus may be an access point (AP) 120 such as a wireless access point device to connect to a wired network using WiFi, WiFi direct, or related standards, a device 130 such as a Bluetooth device or radio frequency identification (RFID) device, etc, and a station for wireless communication such as a carrier service station for 4G, LTE, etc. However, the present general inventive concept is not limited thereto. It is possible that the external apparatus may be another electronic apparatus. It is also possible that the external apparatus may be an apparatus to communicate with the terminal 110 to transmit and receive data therebetween, and such an apparatus may be a home appliance, such as a refrigerator or air conditioner.

The terminal 110 may be disposed within an area defined by a line 120a distanced from the AP 120 or an area defined by a line 130a distanced from the device 130. The terminal 110 may communicate with the AP 120 using the AP-related technology when being disposed within the area defined by the line 120a, and may also communicate with the device using the device-related technology when being disposed within the area defined by the line 130a.

The terminal 110 may have menus and/or functions to correspond to data (signal) of the AP 120, the device 130, and the station 140. The terminal 110 may have menus and functions to correspond to data (signal) stored in a storage unit of the terminal 110.

Figure 2:
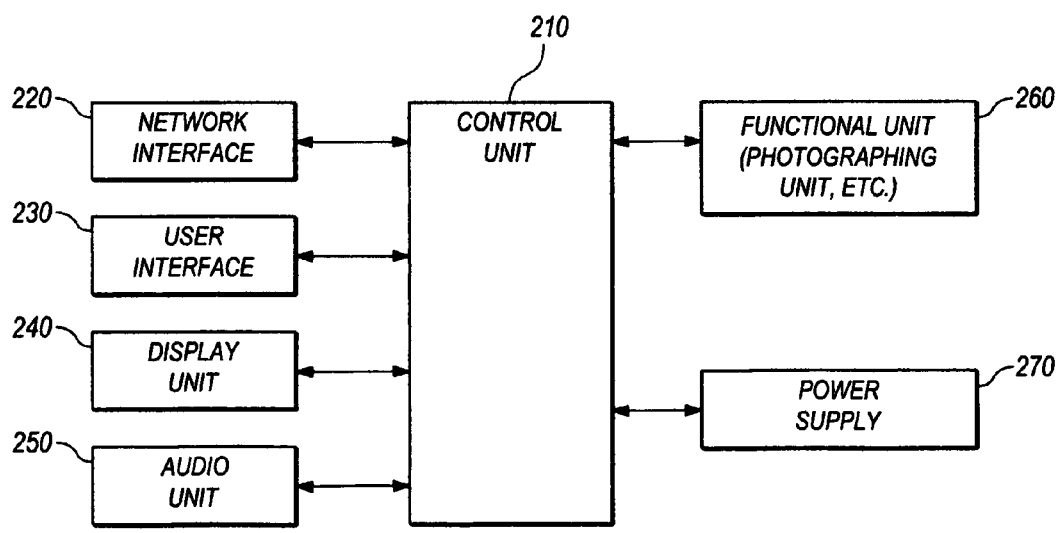
FIG. 2 is a diagram illustrating an electronic terminal according to an embodiment of the present inventive concept.

FIG. 2 illustrates a block diagram of an electronic terminal according to an embodiment of the present inventive concept. The terminal may include a control unit 210, a network interface 220, a user interface 230, a display unit 240, an audio unit 250, one or more functional unit 260, a power supply unit 270 including a battery and a battery charging unit. The above components may be disposed in or on a housing of the terminal.

The control unit 110 may control operations of the terminal and may include a data storage unit, for example, a semiconductor memory unit. The control unit 110 may be connected to an external data storage unit disposed in the housing. The housing of the terminal may include a port such that another external data storage can be detachably attached to the port of the housing, and the port may be connected to the control unit 110 to transmit and receive data.

The network interface unit 220 may communicate with an external network apparatus, for example, the AP 120, the device 130, and the station which are illustrated in FIG. 1.

The user interface unit 230 may receive a user input to control operations of the terminal. The user interface unit 230 may include a physical button or key board such as QWERTY keyboard. The user interface unit 230 may have a sensor to detect a user gesture as a user input. The user interface unit 230 may include a microphone to detect a user voice as a user input. The user interface unit 230 may be a sensor to detect an image as a user input. The display unit 240 may include a screen to display an image corresponding to operations of the terminal. The display unit 240 may include a panel or a touch screen to perform a function to display an image and also a function to receive a user input. The user interface unit 230 and the display unit 240 may be formed as a single integrated body. The audio unit 250 may be a speaker and/or a microphone.

The functional unit 260 may be a photographing unit to photograph an object and to generate a signal corresponding to the photographing object. The signal may be processed in the control unit 210, displayed in the display unit 240, and/or transmitted to the external apparatus through the network interface unit 220.

The power supply unit 270 may be connectable to an external power source using a wired and/or wireless method.

The control unit 210 is configured to selectively perform a security mode according to a condition set by a user when the terminal receives a user input corresponding to a power-on, an activation mode in response to a deactivation mode, a wake-up mode in response to a sleep mode, and/or a normal mode in response to a power-saving mode. The activation, wake-up, and normal mode may be usable as a common function of the terminal or may be usable differently, according to a design or user preference. The condition may be a safe zone condition in a security mode or may be a non-safe zone in a non-security mode, for example. After the condition is set in a normal mode of the terminal, the terminal is changed to the deactivation mode (the sleep mode or the power-saving mode) a predetermined time after the normal mode or a predetermined time after no user input. And then the terminal provides a process for the security mode or does not provide the process for the security mode according to the condition when being changed to the activation mode (wake-up mode or the normal mode) according to the user input.

FIGS. 3A-3D illustrating an electronic terminal 300 formed with a display unit and a user interface unit to display screens 300a-300d corresponding to operations of the electronic terminal 300 according to an embodiment of the present inventive concept.

Figure 3A:
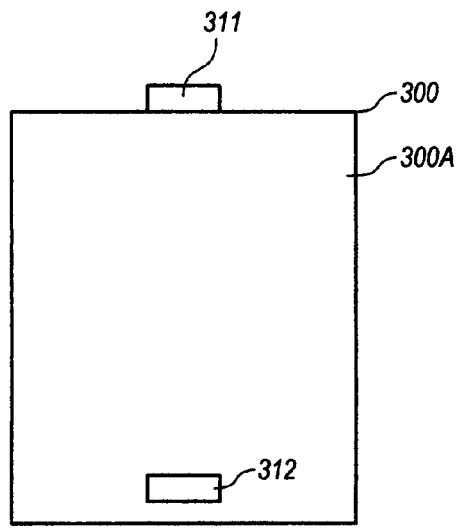
FIGS. 3A-3D are views illustrating an electronic terminal with a display unit and a user interface unit according to an embodiment of the present inventive concept.

As illustrated in FIG. 3A, the screen 300a of the terminal 300 A does not show an image according to a deactivation mode, a sleep mode, or a power saving mode. The terminal 300 may have a power switch 311 and a switch 312 as a user input. The power switch 311 may be usable to turn on and off the terminal, and the switch 312 may be usable to change a mode of the terminal 300, that is, to change from the deactivation mode, the sleep mode, or the power saving mode to an activation mode, a wake-up mode, or a normal mode. The switch 312 may be a sensor to detect a motion of the terminal 300 or to detect a motion (image) of a user as a user input.

Figure 3B:
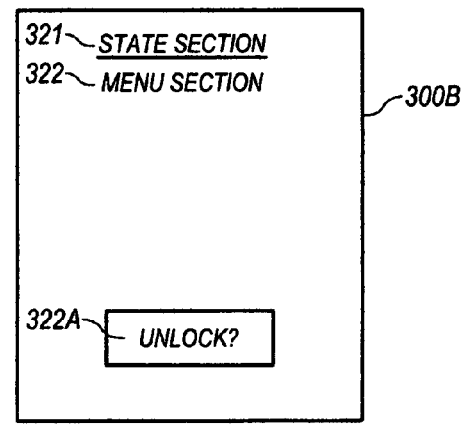

When the switch 312 of FIG. 3A is selected, the screen 300b of FIG. 3B may be displayed on a display unit to unlock or select a security process to access the terminal 300 in a security mode. The screen 300b may include a state section 321 and a menu section 322. The state section 321 may include a communication state with the AP 120, the device 130, and/or the station 321 of FIG. 1, and may also include other states corresponding to operations or functions set in the terminal 300 or environment around the terminal 300. The other states may include a time display or a battery state display, a temperature state display, a weather state display, etc. When the terminal 300 is in a power-on state, the terminal monitors, detects, determines, and/or performs communications with external devices to correspond to the above-described states of the state section 321.

Figure 3C:
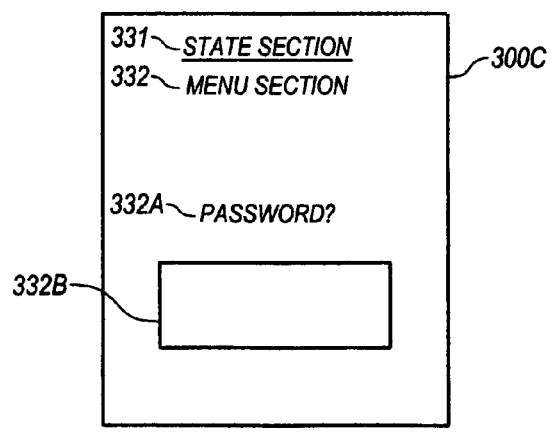
Figure 3D:
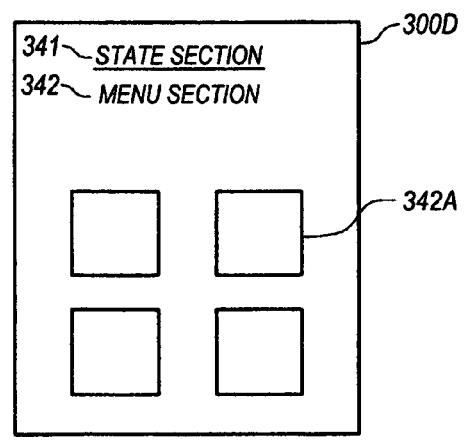

When a menu to unlock the terminal 300 is selected from the screen 300b, the screen 300c is displayed to show a security check process, for example, a password input process, as illustrated in FIG. 3C. The screen 300c may include a state section 331 and a menu section 332 having a password indication section 332a and a password input section 332b. When a password input by the user through the password input section 332b is identical to a password previously stored therein, the terminal 300 displays the screen 300d to show a state section 341 and a menu section 342 with menus (or icons) 342a.

When a first predetermined condition is set in the terminal 300 as a safe zone in a security mode (password setting mode), the screen 300a is change to the screen 300d without displaying the screens 300b and 300c when the first predetermined condition is met. When the first predetermined condition is not met, the terminal displays the screens 200b and 300c to require a security process to enter a password. When a second predetermined condition is set in the terminal 300 as a non-safe zone in a non-security mode (no password setting), the terminal displays the screens 300a, 300b, 300c, and 300d to normally access the terminal when the second predetermined condition is met. When the second predetermined condition is not met, the terminal 300 may not display the screens 300b and 300c.

The state section of the screen 300d may include an image corresponding to the safe zone and/or the non-safe zone according to the security mode and/or non-security mode, respectively. The state section may not be selectable by a user as a user input. The menu section 342 of the screen 300d may include one or more menus selectable by a user as a user input to perform a function or operation of the terminal 300. The menu section 342 of the screen 300d may include a settings menu (icon) to set the security mode, the non-security mode, the safe zone, and/or the non-safe zone, etc.

Figure 4:
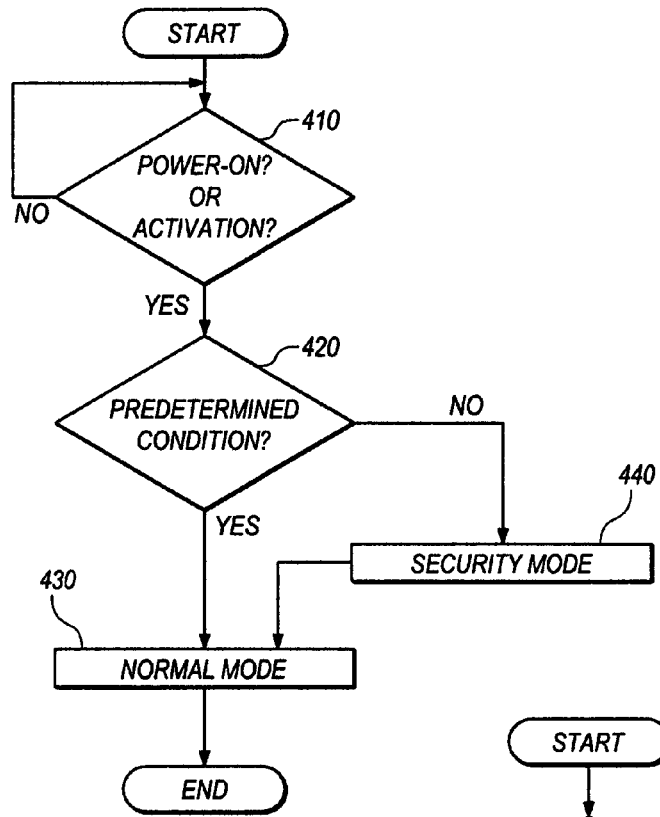
FIG. 4 is a flowchart illustrating a method of selectively applying a security mode in a mobile device according to an embodiment of the present inventive concept.

FIG. 4 illustrates a method of selectively applying a security mode in a mobile device according to an embodiment of the present inventive concept.

A power-on or activation switch is on in operation 410, a control unit of the mobile device determines whether a predetermined condition is met in operation 420. When the predetermined condition is met, that is, the mobile device is in a safe zone, the mobile device operates a normal mode in operation 430 such that a user can access the mobile device. When the predetermined condition is not met in operation 420, that is, the mobile device is not in the safe zone, the mobile device requires a user to enter a password in operation 440 to authorize the user to access the mobile device.

Figure 5:
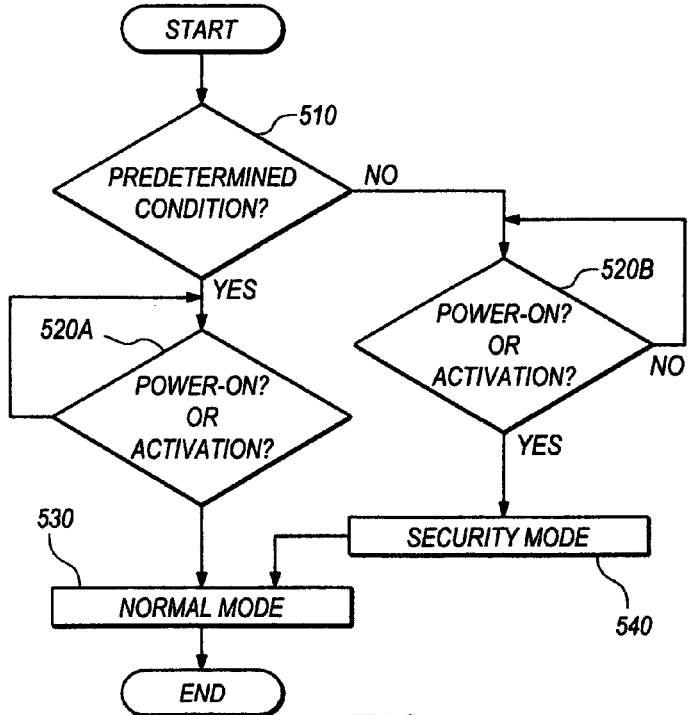
FIG. 5 is a flowchart illustrating a method of selectively applying a security mode in a mobile device according to an embodiment of the present inventive concept.

FIG. 5 illustrates a method of selectively applying a security mode in a mobile device according to an embodiment of the present inventive concept.

A predetermined condition is set in the mobile device in operation 510. When an activation switch is selected in operations 520A or 520B, a security mode is not performed to enter a normal mode in operation 530 or the security mode is performed in operation 540 when the predetermined condition is not met in operation 510. That is, the mobile device selectively performs the security mode according to selection of an activation switch as a user input. The mobile device selectively requires a user to perform the security mode. For example, when the mobile device is in a safe zone according to the predetermined condition, the user is not required to process the security mode to enter a password. However, the mobile device is not in the safe zone according to the predetermined condition, the user is still required to process the security mode to enter a password. Here, the password may be a character, number, motion, audio, and/or image.

Figure 6A:
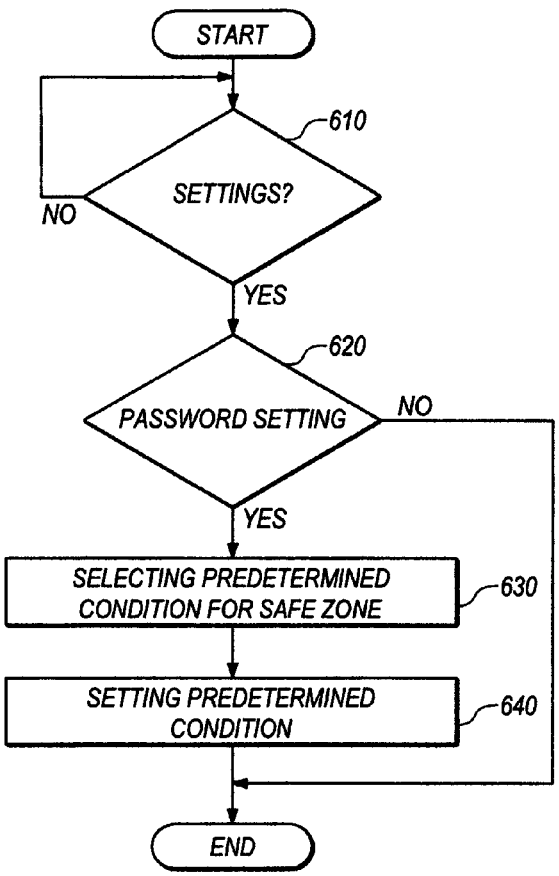
FIG. 6A is a flowchart illustrating a method of setting a condition for a safe zone in a password setting mode of a mobile device according to an embodiment of the present inventive concept.

FIG. 6A illustrates a method of setting a condition for a safe zone in a password setting mode of a mobile device according to an embodiment of the present inventive concept.

A user selects a settings menu in operation 610, and then selects a password setting menu in operation 620 to set the mobile device as a security (password setting) mode or a non-security (no-password setting) mode.

A predetermined condition for a safe zone is selected in operation 630, and then is set in operation 640.

Figure 6B:
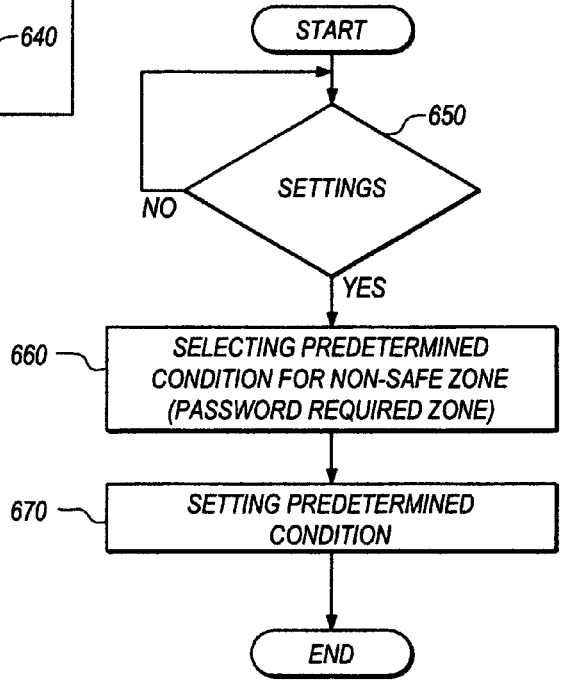
FIG. 6B is a flowchart illustrating a method of setting a condition for a non-safe zone in a non-password mode of a mobile device according to an embodiment of the present inventive concept.

FIG. 6B illustrates a method of setting a condition for a non-safe zone in a non-password mode of a mobile device according to an embodiment of the present inventive concept.

When a user selects a non-security (no-password setting) mode or does not set a security mode in the settings menu in operation 650, the settings menu may further include a menu to select a non-safe zone (or password-required zone) in operation 660. The predetermined condition can be set in operation 670 such that the mobile device monitors a current condition thereof to determine whether the current condition meets the predetermined condition. When the predetermined condition is met, the mobile device requires the user to enter a password to access the mobile device in the non-security mode of the mobile device. When the predetermined condition is not met, the mobile device does not require the user to enter the password in a similar manner to the non-security mode.

FIGS. 7A through 7I illustrate screens 700a through 7I of a mobile device to set a condition for a safe zone of a security mode or a non-safe zone of a non-security mode according to an embodiment of the present inventive concept.

Figure 7A:
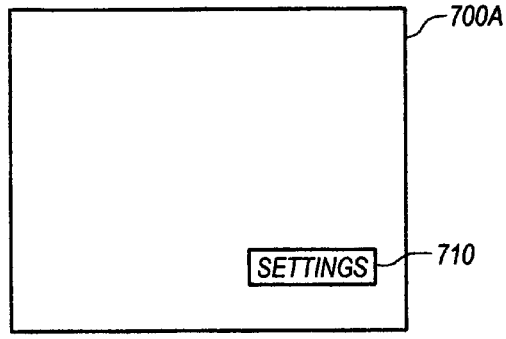
FIGS. 7A through 7I are views illustrating screens of a mobile device to set a condition in a mobile device according to an embodiment of the present inventive concept.
Figure 7B:
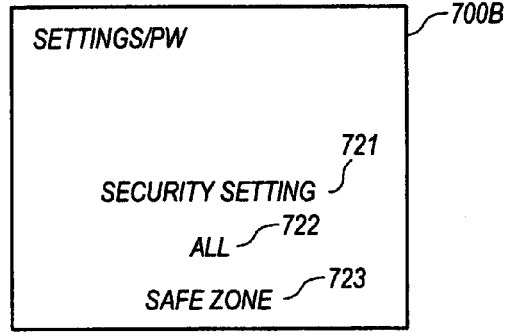
Figure 7C:
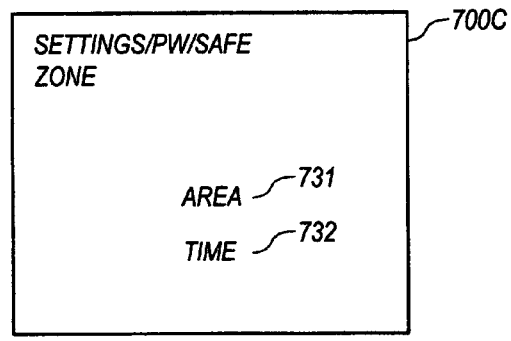

When a settings menu (button or icon) 710 is selected in the screen 700a of the mobile device as a user input in FIG. 7A, the screen 700b of FIG. 7B is displayed on a display unit and/or user input unit of the mobile device to show a selection of "security setting" 721 to set a security (password) as a security mode, a selection of "all" 722 to apply the security mode to all functions or operations of the mobile device, and a selection of a "safe zone" 723 to prevent the security mode in a predetermined condition. It is possible that the selection of "all" 722 and selection of "safe zone" 723 may be displayed in a separate screen from a screen of the security setting 721, that is, the selection of "all" 722 and selection of "safe zone" 723 may be displayed, performed, or selected independently after the security setting 721 is performed to set the security mode.

When a menu of the safe zone 723 is selected, the screen 700c is displayed to show an area menu 731 and/or a time menu 732 as the predetermined condition. It is possible that both the area menu 731 and the time menu 732 can be selected and set as the predetermined condition. It is also possible that only one of the area menu 731 and the time menu 732 can be selected and set as the predetermined condition.

When the time menu 732 is selected, a specific time or a time period is set as the safe zone, using a new screen. Setting a specific time or a time period is well known, detail descriptions thereof will be omitted. When the time menu is performed to set the predetermined condition of the safe zone, the mobile device releases the security mode at the specific time or during the time period such that the user can access the mobile device without the security process according to the set time menu.

Figure 7D:
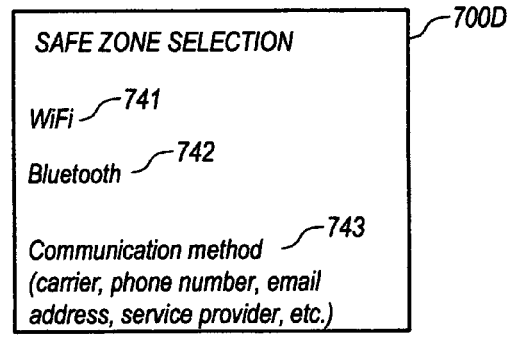

When the area menu 731 is selected, one or more area settings are displayed on the screen 700d of FIG. 7D. The one or more area settings may include a WiFi selection menu 741, a Bluetooth selection menu 742, and a communication method selection menu 743.

Figure 7E:
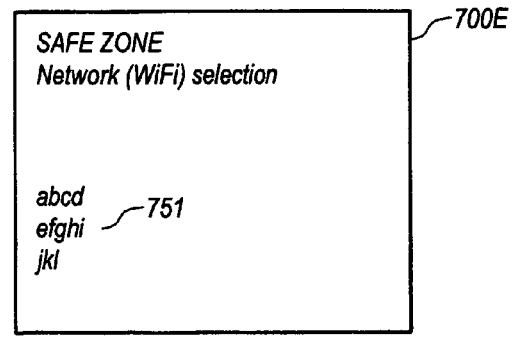

When the WiFi menu 741 is selected, at least one WiFi network 751 can be input, detected and then displayed, or selected as a safe zone in the screen 700e of FIG. 7E. When a user with a mobile device stays in a house of the user, for example, and an AP is located as a home use inside the house of the user, the AP as a home use may be reliable network and environment to the user and thus the home AP can be set as a safe zone. In this case, the user does not have to enter a password every time to activate or access the mobile device within an accessible area of the AP and/or inside the house. However, when a user with a mobile device stays away from the AP, the mobile device requires the user to enter the password since the predetermined condition is not met or the mobile device cannot communicate with the AP or lost a signal from the AP.

Figure 7F:
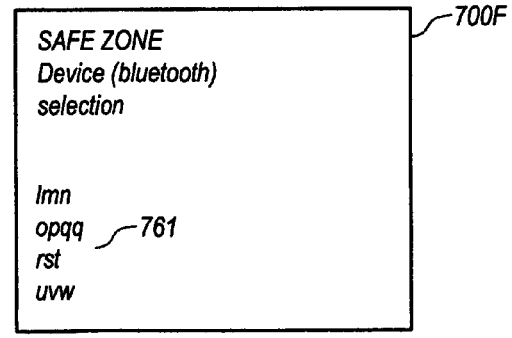

When the Bluetooth (device) is selected, at least one device 761 can be input, detected and then displayed, or selected as a safe zone in the screen 700f of FIG. 7F. When a user with a mobile device is in a vehicle owned by the user, for example, the Bluetooth and/or the vehicle may be reliable network and environment to the user and thus the device can be set as a safe zone. In this case, the user does not have to enter a password every time to activate or access the mobile device within an access area of the device, that is, within an inside of the vehicle.

It is possible that when a user vehicle is set as the device or the AP for the safe zone and when a signal indicating an emergence, for example, traffic collision or accident to the vehicle, is generated from the vehicle and then transmitted to the mobile device through the Bluetooth or WiFi, the mobile device can recognize the received signal as a predetermined condition of a safe zone so that the user can access and/or use the mobile device without entering a password in the security mode of the mobile device. Here, the vehicle and the mobile device are configured to recognize the signal as a portion of the predetermined condition of a safe zone. In this case, a combination of the selected device and a specific or predetermined signal from the selected device can be set as the safe zone of the mobile device, and when the mobile device receives the signal from the device, so that the user can access or use the mobile device without performing a security check process in a security mode of the mobile device.

It is also possible that when a user medical device is set as the device or the AP for the safe zone and when a signal indicating an emergence for example, a life threatening situation or accident to the user, is generated from the medical device and then transmitted to the mobile device through the Bluetooth or WIFi, the mobile device can recognize the received signal as a predetermined condition of a safe zone so that the user can access and/or use the mobile device without entering a password in the security mode of the mobile device. Here, the medical device and the mobile device are configured to recognize the signal as a portion of the predetermined condition of safe zone. In this case, a combination of the selected device and a specific or predetermined signal from the selected device can be set as a predetermined condition of the safe zone of the mobile device, and when the mobile device receives the signal from the device, so that the user can access or use the mobile device without performing a security check process in a security mode of the mobile device.

Figure 7G:
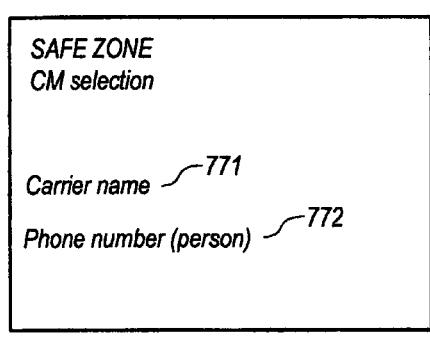

When the communication method 743 is selected, one or more communication methods (CMs) 771 and 772 can be selected and set as a safe zone on the screen 700g of FIG. 7G. In this case, a carrier name 771 and/or telephone number 772 can be reliable to the user. That is, when the user communicates with the person of the telephone number and the carrier name, the user does not have to enter a password to use the mobile device.

Figure 7H:
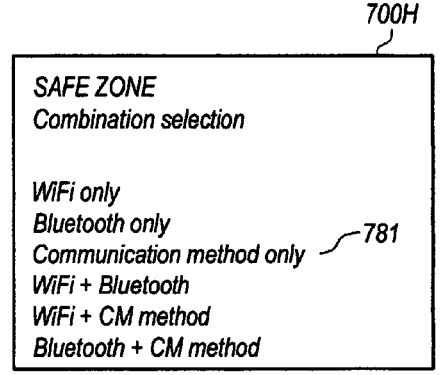
Figure 7I:
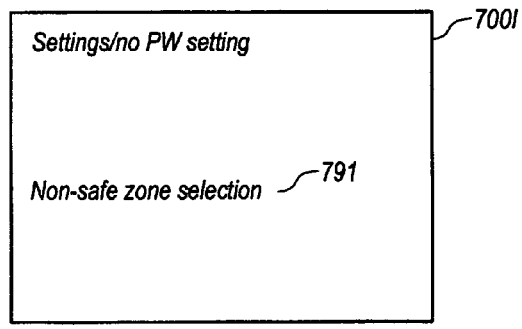

In the screen 700h of FIG. 7H, at least one or a combination of the Wifi, Bluetooth, and communication method can be selected and/or set in a menu 781 as safe zone.

When the security mode is not selected or set in the settings menu 710 of the screen 700a, a menu 791 of non-safe zone can be selected and set such that the mobile device is set to perform a security mode in a non-security mode of the mobile device. For example, an AP, a device, or a communication method is set as the non-safe zone using one or more non-safe zone selection processes similar to the safe zone selection processes of FIGS. 7D through 7H.

FIGS. 8A through 8F illustrate screens 800a through 800f of a mobile device to perform operations in a safe zone and in a non-safe zone according to an embodiment of the present inventive concept.

Figure 8A:
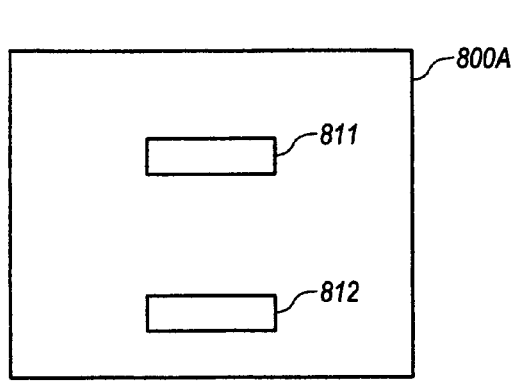
FIGS. 8A through 8F are views illustrating screens of a mobile device to perform operations in a safe zone and in a non-safe zone according to an embodiment of the present inventive concept.
Figure 8B:
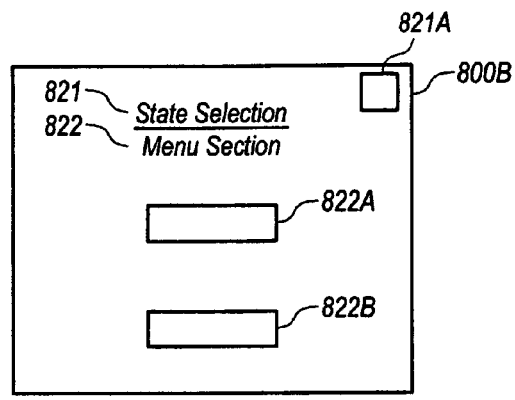
Figure 8C:
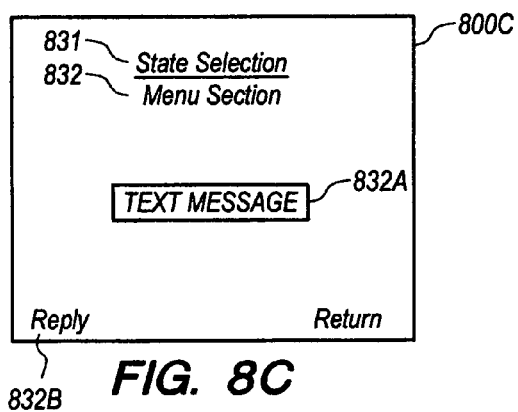
Figure 8D:
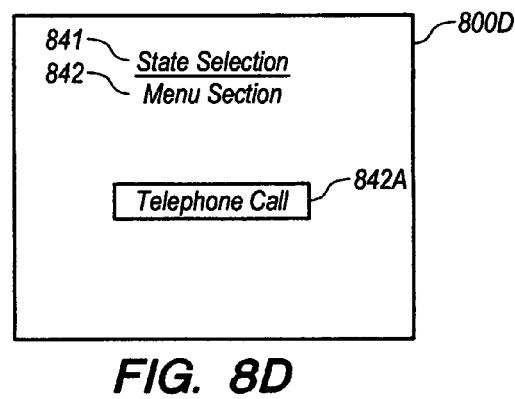

FIG. 8A illustrates the screen 800a, a power on/off switch 811, and an activation switch 812. FIG. 8B illustrates the screen 800b including a state section 821 and a menu section 822. The state section 821 may be similar to the state section 321, 331, and 341 of FIGS. 3B, 3C and 3D. The state section 821 may include a state indicator 821a to indicate a predetermined state and/or a safe zone in a security mode. The states displayed on the state section 821 may not be selectable by a user as a user input. The menu section 822 may include one or more menus 822a and 822n which are displayable on a display unit and/or selectable by a user as a user input.

When a current condition matches the predetermined condition as the safe zone, the mobile device displays the screen 800b by skipping a security mode process. It is possible that the mobile device can display on the screen 800c with a state section 831 and a menu section 832 including a test message 832a and selection menus 832b relating to the displayed text 832a when the mobile device receives the test message. It is also possible that the mobile device can display on the screen 800d with a state section 841 and a menu 4 including a telephone call message 842a including selection menus relating to the telephone call message 842a when the mobile device receives the telephone call such that the user can access and use the mobile device.

Figure 8E:
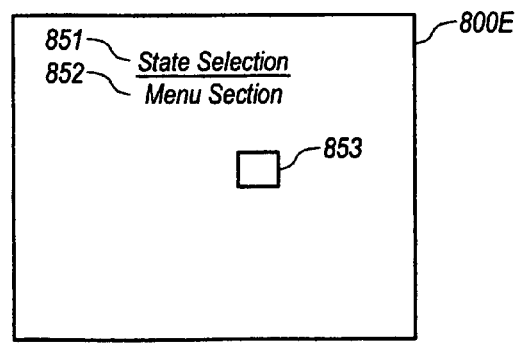
Figure 8F:
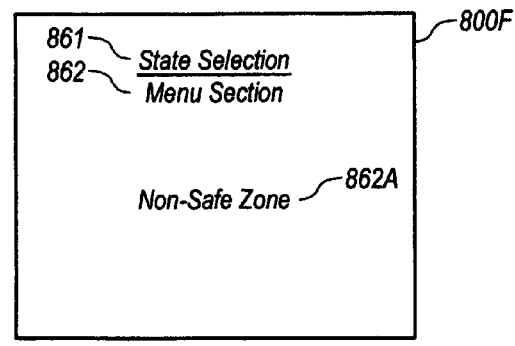

The screen 800e of FIG. 8E illustrates a state section 851 and a menu section 852 including at least one menu 852. The screen 800e may be displayed when a password is entered in a security (password-setting) mode, when a predetermined condition of a safe zone is met in the security mode, or when a password is entered in a non-security mode and in a non-safe zone. The menu 852 may be a settings menu to select, change, or modify settings of the mobile device. In this case, it is possible that the mobile device may require the user to enter a password to select, change, or modify settings when the screen 8003 is displayed when a predetermined condition of a safe zone is met in the security mode and accordingly a security mode is not preformed.

Figure 9:
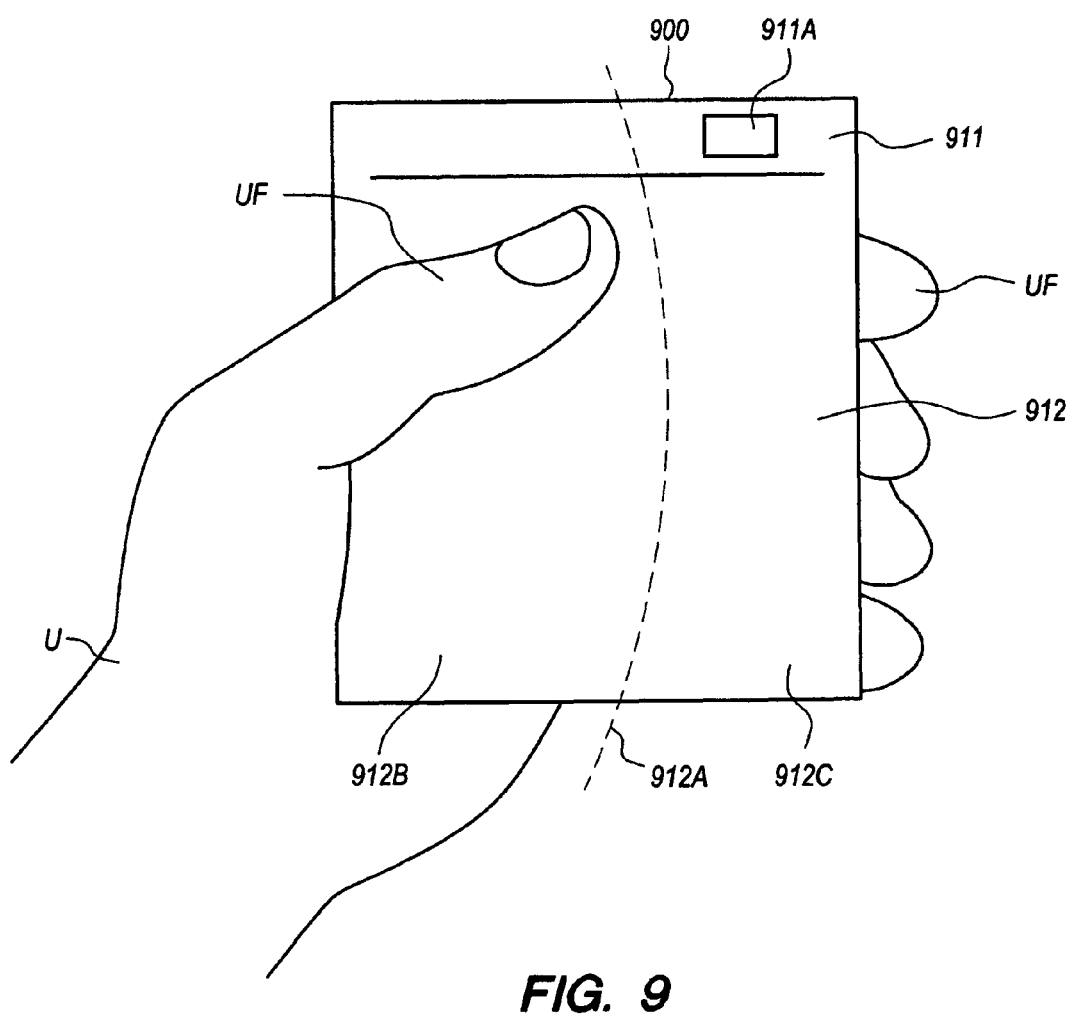
FIG. 9 is a view illustrating a mobile device to display a user input menu within a user finger-reaching area according to an embodiment of the present inventive concept.

FIG. 9 illustrates a mobile device 900 to display a state section 911 and a user menu section 912 according to an embodiment of the present general inventive concept. A user U holds the mobile device 900 using one hand. At least one of user fingers UF of the user one hand can be usable to select a menu to input a user input. The user menu section 912 may include a user menu area 912b and a non-user menu area 912c which are defined by a line to be a user-finger reachable area and a user-finger unreachable area, respectively. One or more menus or images displayed within the user menu area can be selectable by a user using a finger without assistance of the other hand finger, and one or more menus or images displayed within the non-user menu area 912c may not be reachable selectable by the user using the same finger. It is possible that the non-user menu area 912c may not include a menu to be selectable by a user as a user input. Accordingly, a user can control the mobile device with one hand.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a read-only memory (ROM), a random-access memory (RAM), a flash memory, a semiconductor chip package, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As illustrated above, a mobile device can be set in a security mode and the security mode can be set with a safe zone so that a mobile device does not require a user to enter a password when a current condition matches a predetermined condition of the safe zone.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A mobile device comprising:
    a photographing unit to photograph an object;
    a user interface unit to receive a user input;
    a network interface unit to communicate with external devices;
    a display unit having a panel to display an image corresponding to the photographed object, to display a first screen on the panel to set the mobile device in a security mode which requires a security process of receiving a password to operate a normal mode of the mobile device in the set security mode, and to display a second screen on the panel to set a condition of a safe zone which does not require the security process in the set security mode to operate the normal mode of the mobile device in the set security mode;
    a switch to change the mobile device from a power saving mode to the normal mode; and
    a control unit configured to receive a selection of the switch, and configured to not require the security process in the set security mode to operate the normal mode of the mobile device when the set condition of the safe zone is met and when the selection of the switch is received, and to require the security process in the set security mode to operate the normal mode of the mobile device in the set security; mode when the set condition of the safe zone is not met and when the selection of the switch is received,
    wherein the set condition of the safe zone comprises a detection of a connection state of one of the external devices and a time condition.

2. The mobile device of claim 1, wherein the control unit does not require the security process in the set security mode when the set condition of the safe zone is met after the selection of the switch is received.

3. The mobile device of claim 1, wherein the control unit does not require the security process in the set security mode when the selection of the switch is received after the set condition of the safe zone is met.

4. The mobile device of claim 1, wherein the power saving mode corresponds to a power-off mode or a deactivation mode, and the normal mode corresponds to a power-on mode or an activation mode.

5. The mobile device of claim 1, wherein the set condition of the safe zone comprises a time or a period of time, and the control unit releases the security mode at the time or during the period of time such that a user accesses the normal mode of the mobile device without the security process in the set security mode.

6. The mobile device of claim 1, wherein the set condition of the safe zone comprises an area within which the mobile device is disposed, and the control unit does not requires the security process in the set security mode when the mobile device is inside of the area.

7. The mobile device of claim 1, wherein:
the set condition of the safe zone comprises a selection of one of the external devices and a detection of the selected external device; and
the selected external device is one of a vehicle and a medical device.

8. The mobile device of claim 7, wherein the control unit requires the security process in the set security mode to operate the normal mode of the mobile device in the set security mode when the mobile device does not communicate with the vehicle or the medical device, or when the mobile device loses a signal from the vehicle or the medical device.

9. The mobile device of claim 1, wherein the set condition of the safe zone comprises a selection of one of the external devices, a detection of the selected external device, and a receipt of an emergency signal from the selected external device.

10. The mobile device of claim 1, wherein:
the set condition of the safe zone comprises a selection of one of the external devices and a detection of the selected external device; and
the selected external device is an access point.

11. The mobile device of claim 10, wherein the control unit requires the security process in the set security mode to operate the normal mode of the mobile device in the set security mode when the mobile device stays away from the access point, when the mobile device does not communicate with the access point, or when the mobile device loses a signal from the access point.

12. The mobile device of claim 1, wherein the set condition of the safe zone comprises a selection of one of the external devices and a detection of the selected external device; and
the selected external device is a home appliance apparatus having a wireless communication function to communicate with the network interface of the mobile device.

13. The mobile device of claim 1, wherein the set condition of the safe zone comprises a selection of one of the external devices and a detection of the selected external device; and
the selected external device is a refrigerator having a wireless communication function to communicate with the network interface of the mobile device.

14. The mobile device of claim 1, wherein:
the set condition of the safe zone comprises a communication method corresponding to a carrier name or a telephone number; and
the control unit does not require the security process in the set security mode to operate the normal mode of the mobile device according to the selected switch and communication through the carrier name or the telephone number corresponding to the set condition of the safe zone.

15. The mobile device of claim 1, wherein the switch comprises a sensor to detect a motion of the mobile device.

16. A mobile device comprising:
a photographing unit to photograph an object;
a user interface unit to receive a user input;
a network interface unit to communicate with external devices;
a display unit having a panel to display an image corresponding to the photographed object, to display a first screen on the panel to set the mobile device in a security mode which requires a security process of receiving a password to operate a normal mode of the mobile device in the set security mode, and to display a second screen on the panel to set a condition of a safe zone which does not require the security process in the set security mode to operate the normal mode of the mobile device; and
a control unit configured to not require the security process in the set security mode to operate the normal mode of the mobile device in the set security mode when the set condition of the safe zone is met, and configured to require the security process in the set security mode to operate the normal mode of the mobile device when the set condition of the safe zone is not met,
wherein the set condition of the safe zone comprises a selection of one of the external devices, a detection of a connection state of the selected external device, and a receipt of an emergency signal from the selected external device.

17. The mobile device of claim 16, wherein the emergency signal represents an accident or a collision.

18. The mobile device of claim 16, further comprising:
a switch to change the mobile device from a power saving mode to the normal mode,
wherein the control unit does require the security process in the set security mode to operate the normal mode of the mobile device in the set security mode when the set condition of the safe zone is met and when the switch is selected, and the control unit requires the security process in the set security mode to operate the normal mode of the mobile device in the set security mode when the set condition of the safe zone is not met and when the switch is selected.

19. A mobile device comprising:
a photographing unit to photograph an object;
a user interface unit to receive a user input;
a network interface unit to communicate with external devices;
a switch to change the mobile device from a power saving mode to a normal mode;
a display unit having a panel to display an image corresponding to the photographed object, to display a first screen on the panel to set the mobile device in a security mode which requires a security process of receiving a password to operate the normal mode of the mobile device in the set security mode, and to display a second screen on the panel to set a condition of a safe zone as an exceptional condition of the set security mode, which does not require the security process in the set security mode to operate the normal mode of the mobile device; and
a control unit configured to not require the security process in the set security mode to operate the normal mode of the mobile device in the set security mode when the set condition of the safe zone is met, and configured to require the security process in the set security mode to operate the normal mode of the mobile device in the set security mode when the set condition of the safe zone is not met,
wherein the set condition of the safe zone comprises a detection of a connection state of one of the external devices and an area condition.

* * * * *